(12) United States Patent
Maiello

(10) Patent No.: US 6,634,352 B2
(45) Date of Patent: Oct. 21, 2003

(54) DIRECT VENTING VENT PIPE

(75) Inventor: Dennis Maiello, Collierville, TN (US)

(73) Assignee: American Metal Products Company, Olive Branch, MS (US)

( * ) Notice: Subject to any disclaimer, the term of this patent is extended or adjusted under 35 U.S.C. 154(b) by 0 days.

(21) Appl. No.: 10/043,398

(22) Filed: Jan. 10, 2002

(65) Prior Publication Data

US 2002/0092518 A1 Jul. 18, 2002

Related U.S. Application Data

(60) Provisional application No. 60/262,425, filed on Jan. 17, 2001.

(51) Int. Cl.[7] .............................. F23J 11/00; F16L 17/00
(52) U.S. Cl. ..................... 126/307 R; 126/312; 454/47; 285/123.15; 285/123.16; 285/361
(58) Field of Search .............................. 126/307 R, 312, 126/85 B, 318, 307 A; 454/47, 44; 285/123.15, 123.16, 424, 263, 47, 361; 138/113

(56) References Cited

U.S. PATENT DOCUMENTS

| | | | | |
|---|---|---|---|---|
| 3,872,780 A | * | 3/1975 | Zanias | 454/47 |
| 4,277,092 A | * | 7/1981 | Viers | 285/263 |
| 4,427,220 A | * | 1/1984 | Decker | 285/263 |
| 4,448,449 A | * | 5/1984 | Halling | 285/263 |
| 4,522,191 A | * | 6/1985 | Knowles et al. | 126/307 R |
| 5,651,732 A | * | 7/1997 | Dufour | 126/307 R |
| 6,062,608 A | * | 5/2000 | Gerth | 285/123.15 |
| 6,076,862 A | * | 6/2000 | Barth et al. | 285/424 |

* cited by examiner

Primary Examiner—James C. Yeung
(74) Attorney, Agent, or Firm—Calfee, Halter & Griswold, LLP

(57) ABSTRACT

A venting system for a direct vent fireplace or other direct vent appliance to direct combustion gases to an exterior area. The direct venting vent pipe facilitates unrestricted lengths of pipe installations. The vent pipe has a double wall construction forming an interior axial passageway and a coaxial outer passageway. The double walls are spaced apart by an insert to maintain coaxial spacing. Sections of the vent pipe are lockingly connected to prevent separation and ensure sealing connection between the pipe sections. Elastic seal members are utilized between the matingly connected sections and a mechanical lock assembly prevents separation.

11 Claims, 3 Drawing Sheets

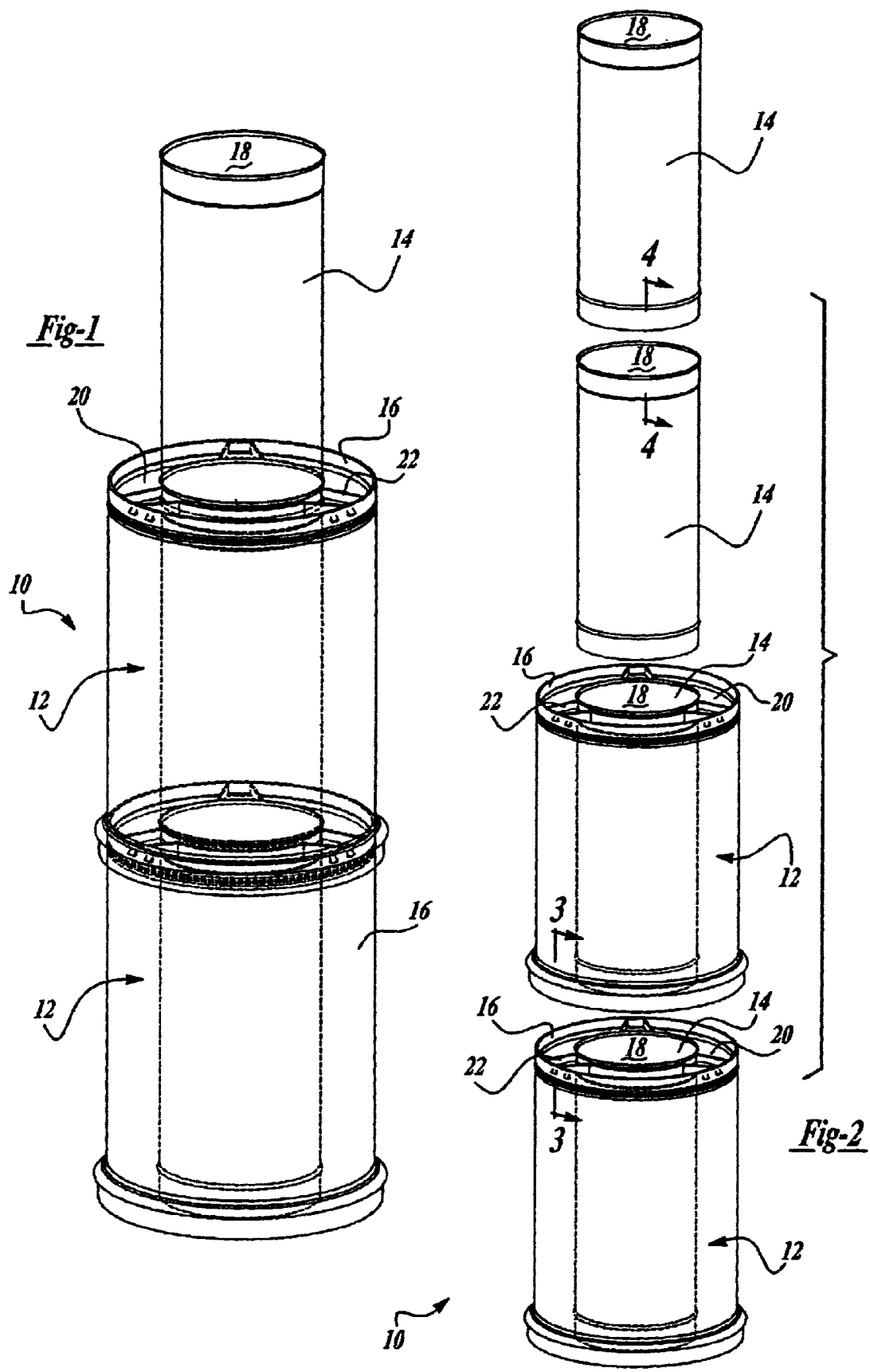

DIRECT VENTING VENT PIPE

RELATED APPLICATIONS

This application claims priority from U.S. Provisional Application No. 60/262,425 filed on Jan. 17, 2001.

BACKGROUND OF THE INVENTION

I. Field of the Invention

This invention relates to chimney pipes for directing exhaust from a fireplace and other appliances to the exterior and, in particular, to an improved joint sealing and locking assembly to connect segments of the vent pipe.

II. Description of the Prior Art

Heating appliances have become increasingly popular as homeowners "cocoon" and make use of their homes for entertaining. Gas, real wood and pellet stoves and fireplaces all require the venting of combustion gases to the exterior. It is desirable to direct such combustion gases to the exterior without backdraft. Furthermore, such vent pipes can become hot requiring sufficient insulation around building materials.

Multiple wall vent pipes efficiently direct combustion gases through a main central passageway while coaxial passageways created by larger diameter pipes allow not only for the supply of combustion air to the heating appliance but also act as an insulation barrier. However, connection of the pipe sections in some pipe assemblies is cumbersome requiring fasteners and the like. Additionally, the passageways of the vent pipe must be sealingly isolated to prevent the flow of gases from one to the other. The interior pipe passageway must efficiently direct the majority of gases to the exterior.

SUMMARY OF THE PRESENT INVENTION

The present invention overcomes the disadvantages of the prior known vent pipe assemblies by providing a pipe constructed of sections lockingly and sealingly connected to facilitate pipe runs of unrestricted length.

The direct venting pipe includes a double wall system which allows for the flow of exhaust gases created from the combustion of gaseous hydrocarbons such as natural gas, wood products or propane from the appliance. The pipe allows simultaneous flow of oxygenated air from a suitable source to mix with the gaseous hydrocarbons for more efficient combustion. The piping system incorporates tubes formed of galvanized and stainless sheet metal to create a concentric pipe capable of containing such exhaust or oxygenated gases at elevated or lowered temperatures without leakage through the seams of the joined pipe sections. The pipe sections are sealed by the unique application of an O-ring seal mounted to the pipe ends to prevent any leakage and mixing of the gases. The pipe joints are further joined by a locking system incorporated into the exterior wall which joins the pipe sections longitudinally. The locking system also serves as an integral part of the sealing system by ensuring sealing seating of the O-ring seals.

In one preferred embodiment of the invention, the pipe sections are locked together through a bayonet-type connection by passing locking tabs through corresponding slots then rotating to misalign the tabs from the slots preventing longitudinal separation. Unlike prior known bayonet couplings the tabs and slots are unequally spaced such that the pipe sections can only be joined in one orientation. The unequal spacing of the tabs on one end of the pipe section and the identical spacing of the longitudinal slots on the adjacent pipe section, allows the pipe sections to be joined and disconnected in only one orientation. The longitudinal slots communicate with a peripheral slot accepting the locking tabs. This also allows complete 360 degree rotation before the tabs are realigned with the slots. Prior known locking systems will align every 90 or 120 degrees depending upon the number of tabs. The O-ring seal disposed between the pipe sections is preferably made of a graphite material which has a low coefficient of friction to facilitate manipulation of the joined pipe sections. It has been found that such graphite seals can withstand extreme temperatures and still allow for heat expansion movement of the pipe sections.

In order to maintain the proper spacing between the inner and outer walls and thereby maintain the outer passageway, a plurality of standoffs are disposed between the walls. The standoffs are positionally captured and circumferentially spaced to maintain the desired spacing. The standoffs are fabricated from a metal capable of withstanding the temperature extremes associated with the vent pipe.

The present invention further incorporates termination caps for both horizontal and vertical installations. The termination caps maintain separation of the exhaust and oxygenated air during use. Such caps further serve to repel precipitation and objects from entering the pipe system and are attached to the pipe segments utilizing the unique sealing and locking mechanisms of the present invention.

Other objects, features and advantages of the invention will be apparent from the following detailed description taken in connection with the accompanying drawings

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the view and in which:

FIG. 1 is a perspective view of an assembled vent pipe embodying the present invention;

FIG. 2 is an exploded view of the vent pipe;

DETAILED DESCRIPTION OF A PREFERRED EMBODIMENT OF THE PRESENT INVENTION

Referring first to FIGS. 1 and 2, there is shown at least a portion of a vent pipe 10 adapted to direct combustion gases from an appliance to a remote location for venting while also supplying oxygenated air to the appliance to aid in the combustion process. The vent pipe 10 maintains separation of the exhaust gases and the inlet gases to prevent mixing. A typical installation may include connection to a fireplace for venting combustion exhaust to the exterior of the building. In addition to facilitating the flow of gases to and from the appliances the vent pipe 10 must withstand extreme temperatures while disposed within the structure surrounding the appliance. Such temperatures not only have insulative considerations but subject the vent pipe 10 to thermal expansion and contraction. The vent pipe 10 will be generally described in connection with venting of exhaust gases from a fireplace although it is to be understood that the vent pipe 10 may be used with a variety of appliances including stoves, heating systems and both natural and artificial fireplaces.

Figure 3:
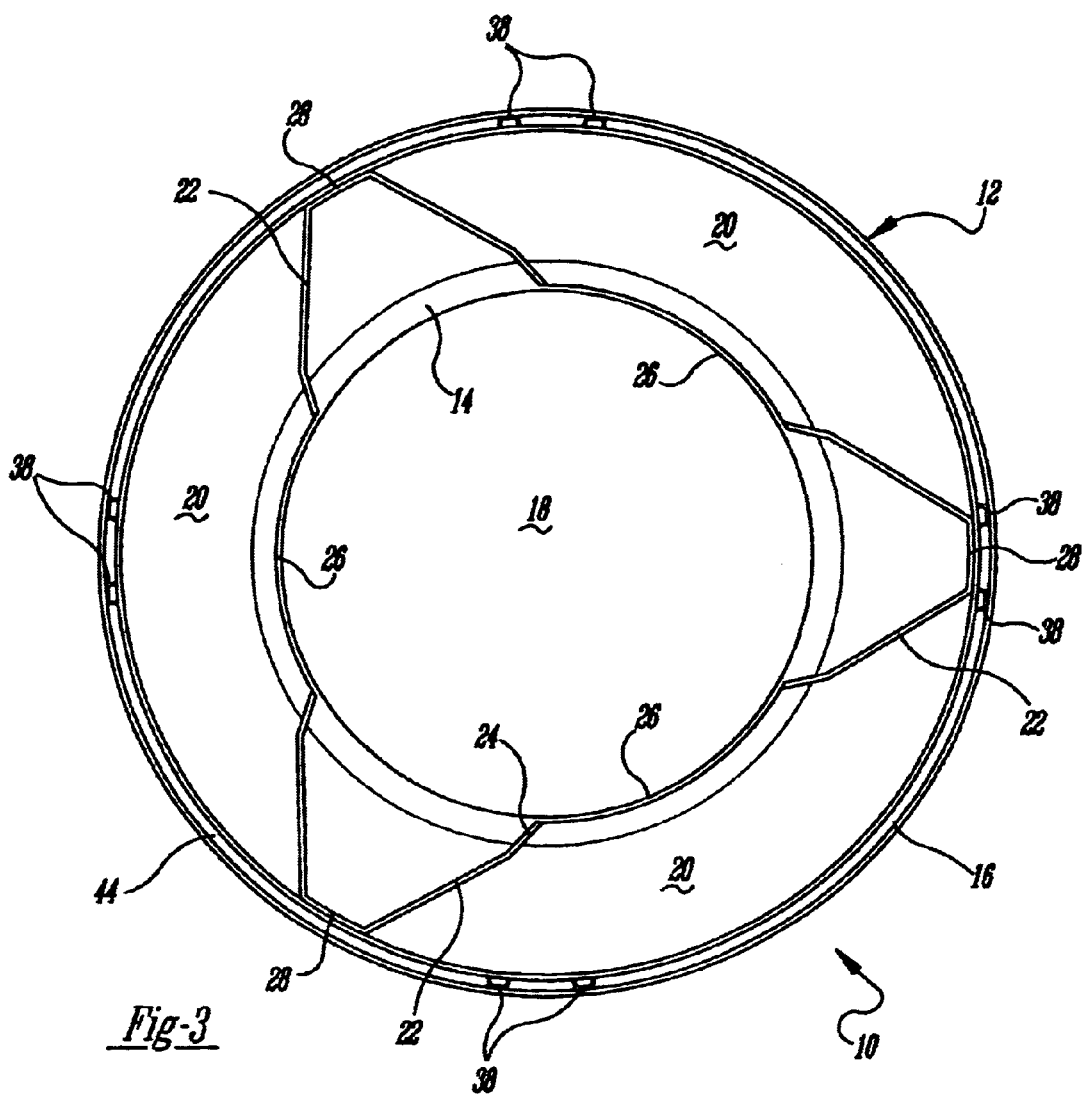
FIG. 3 is a lateral cross-sectional view of the joined pipe segments.

The vent pipe 10 generally comprises a plurality of pipe segments 12 axially joined to form a continuous pipe 10 from the appliance to an outlet. The cooperating segments 12 are matingly joined to seal against the intermixing of gases while withstanding thermal expansion and contraction as will be subsequently described. The individual segments 12 preferably include an inner pipe 14 and a concentric outer pipe 16. The inner pipe 14 forms an inner or axial passageway 18 designed to exhaust the combustion gases from the appliances. The inner 14 and outer 16 walls create an outer passageway 20 coaxial with but separated from the inner passageway 18. As best shown in FIG. 3, the concentric separation between the inner pipe 14 and the outer pipe 16 is maintained by a plurality of standoffs 22 circumferentially spaced within the outer passageway 20. In a preferred embodiment, the standoffs 22 are part of a ring 24 insert between the walls 14,16. The ring 24 includes connecting members 26 between the standoffs 22 which engage the inner pipe 14. The individual standoffs 22 have a substantially trapezoidal configuration with an outer surface 28 selectively engaging the outer pipe 16. The standoff ring 24 may be positionally captured between the pipes 14,16 and may be secured therebetween such as through spot welding.

A plurality of pipe segments 12 are lockingly joined to form isolated inner 18 and outer 20 longitudinal passageways. Locking of the pipe segments 12 is carried out by the outer pipe 16 thereby allowing mechanical separation if necessary. Upon joining the pipe segments 12, the inner passageway 18 is sealingly isolated from the outer passageway 20.

Figure 5:
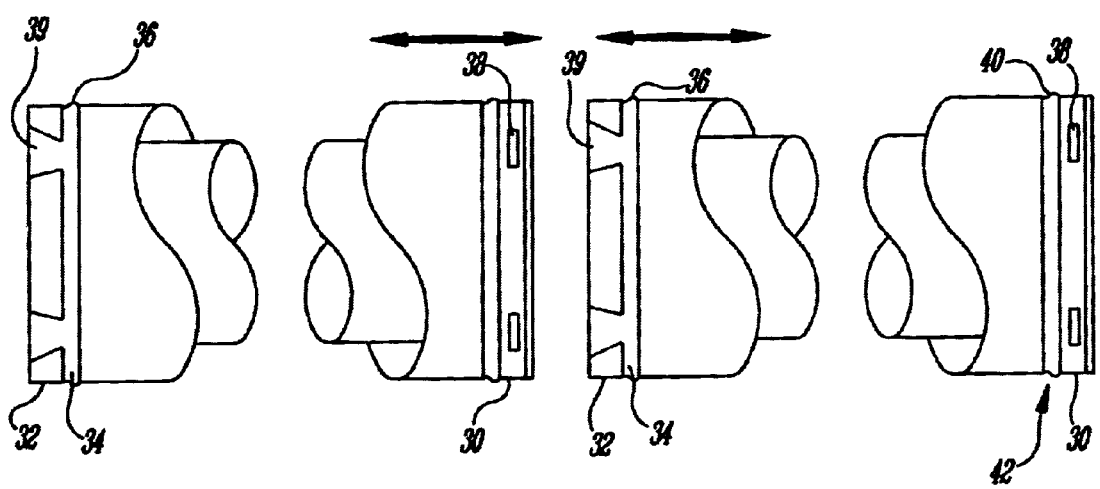
FIG. 5 is a plan view of an outer pipe section.

Referring now to FIG. 5, the outer pipe 16 includes a first end 30 for matingly receiving a second end 32 of an adjoining outer pipe 16. The second end of the outer pipe 16 includes an annular locking groove 34. An inwardly disposed annular shoulder 36 is formed longitudinally inwardly of the locking groove 34. These features are designed to cooperate with features of the first end 30 of an adjoining segment 12. The first end 30 has a plurality of circumferentially spaced locking tabs 38. In a preferred embodiment, the locking tabs 38 are formed by stamping the tab 38 at predetermined locations around the pipe 16. These tabs 38 cooperate with the locking groove 34 upon mating connection of pipe segments 12 as will be subsequently described. Seated within the seal groove 40 is an annular seal member 42 for sealing the gap 44 between first end 30 and the second end 32. The seal 42 of the present invention has a unique composition to ensure sealing while also facilitating movement between the components during assembly as well as due to thermal expansion.

In a preferred embodiment, the annular seal member 42 is a graphoil gasket capable of withstanding the extreme temperatures associated with such chimney stacks yet facilitating manipulation and joining of the pipe segments. The graphoil gasket may be in the form of a graphite coated material capable of wrapping around the circumference of the pipe segment. The carrier membrane may be a foil or a nylon material for improved material strength.

Figure 4:
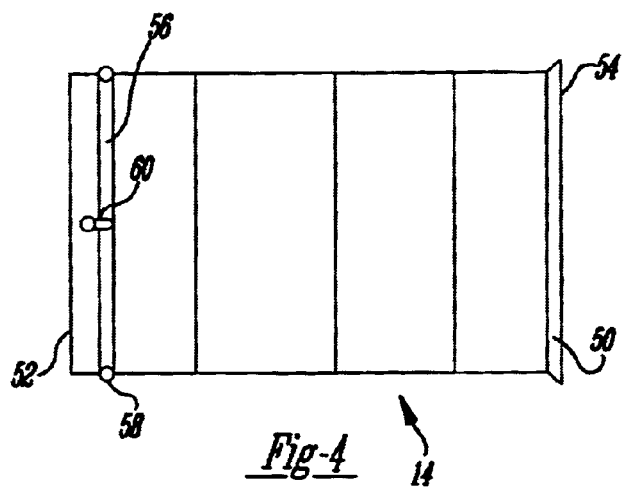
FIG. 4 is a plan view of an in section.

While the outer pipes 16 of adjoining pipe segments 12 are locked together by the interaction of the locking tabs 38 within the locking groove 34, the inner pipes 14 are merely matingly sealed to prevent the flow of gases between the inner and outer passageways 18,20. The inner pipe 14 of FIG. 4 has an enlarged diameter first end 50 adapted to matingly receive a second end 52 of an adjoining inner pipe 14. A flared flange 54 is formed on the first end 50 to facilitate mating insertion of the adjoining inner pipe 14. Formed proximate the second end 52 of the inner pipe 14 is an inner annular seal groove 56 for receiving annular seal 58. The inner seal groove 56 formed in the exterior surface of the inner pipe 14 is configured to receive an O-ring seal. The inner seal member 58 is preferably the graphoil seal capable of withstanding the temperatures associated with the inner pipe 14 yet facilitating relative movement of the adjoining inner pipes 14 during assembly and subsequent thermal expansion and contraction. The inner pipe 14 includes a keyhole slot 60 proximate the seal groove 56 for retaining the graphoil seal 58 and preventing its circumferential movement. The seal 58 seals the gap between the mating inner pipes 14 but does not inhibit relative movement of the inner pipe segments 14 whether during assembly or as a result of thermal expansion and contraction.

Assembly of the pipe segments 12 will create a continuous vent pipe 10 as shown in FIGS. 1 and 2. The individual pipe segments 12 are constructed with an inner pipe 14 concentrically disposed within the outer pipe 16. The standoff ring 24 is inserted between the inner pipe 14 and the outer pipe 16 to maintain concentric spacing and form the inner passageway 18 and the outer passageway 20. The individual pipe segments 12 may be shipped to the site for assembly and connection to the appliance to be vented and the exterior area.

The pipe segments 12 are assembled by matingly joining the second end of one segment 12 into the first end of the adjoining segment 12. As the segments 12 are joined, the second end 52 of the inner pipe 14 will mate into the first end 60 of the adjoining pipe 14. As the second end 52 passes into the first end 50, the seal ring 58 will be compressed between the walls of the mating inner pipes 14 sealing the gap therebetween.

Simultaneous with the mating connection of the adjoining inner pipes 14, the outer pipes 16 will be matingly joined. The second end 32 of the outer pipe 16 will be matingly received within the first end 30 of the adjoining outer pipe 16. The second end 32 will be inserted until the locking tabs engage the annular shoulder 36. During insertion, the locking tabs 38 will pass through the longitudinal slots 39 until they reach the circumferential locking groove 34 at which point the tabs 38 will seat in the groove 34. The seal element 42 carried in the seal groove 40 will be in sealing engagement with the adjoining outer pipe 16 to seal the gap 44. With the locking tabs 38 positioned within the annular groove 34 and misaligned from their respective slots 39, inadvertent separation of the pipe segments 12 will be prevented. The seal element 42 will seal the outer seam 70 formed by mating outer pipes 16 yet allow for both longitudinal and radial movement resulting from changes in temperature. No interconnection between adjoining inner pipes 14 is made other than to seal the seam 72 formed by the mating pipes. The seal 58 prevents gases from flowing between the inner passageway 18 and the outer passageway 20. However, because the inner pipes 14 are not interconnected, the pipe segments 12 are fully capable of withstanding thermal expansion and contraction without compromising the seals of the seams 70 and 72.

In one form of the invention, the locking tabs 38 and slots 40 are irregularly spaced around the circumference of the outer pipe 16 creating a "keying" effect whereby adjoining pipe segments can only be joined and disconnected in one orientation to allow the tabs 38 to pass through the slots 39. Conversely, the adjoining pipes can only be separated in one orientation allowing the tabs 38 to travel 360 in the groove. With equally spaced tabs 38 and slots 39, the pipe segments could be separated every 90° or 120° of rotation depending upon number and spacing of the tabs. The present invention contemplates separation in only a single orientation by irregularly spacing the tabs 38 and slots 39 and facilitating 360° rotation of the pipe segments.

The foregoing detailed description has been given for clearness of understanding only and no unnecessary limitations should be understood therefrom as some modifications will be obvious to those skilled in the art without departing from the scope and spirit of the appended claims.

What is claimed is:

1. A vent pipe for directing gases from a source to an outlet, said vent pipe comprising:

a plurality of pipe segments longitudinally connected to form said vent pipe, one of said pipe segments including:

an inner pipe forming an inner passageway, said inner pipe having a first end and a second end wherein said first end includes an annular groove and keyhole slot proximate said annular groove;

an outer pipe having a larger diameter than said inner pipe and disposed concentric with said inner pipe to form an outer passageway between said inner pipe and said outer pipe, said outer pipe having a first end and a second end;

said pipe segments longitudinally connected to form said vent pipe such that said first end of said inner pipe is sealingly matingly received within said second end of said inner pipe of an adjoining pipe segment and said first end of said outer pipe is lockingly matingly received with said second end of said outer pipe of said adjoining pipe segment whereby said adjoining pipe segments are interconnected to allow for variances in thermal expansion between said adjoining pipe segments; and a seal member including a graphite material to facilitate mating connection of said adjoining inner pipes, said seal member extending circumferentially around said first end of said inner pipe such that said seal member seals the space between mated ends of said adjoining inner pipes and wherein said keyhole slot positionally captures said seal member.

2. The vent pipe as defined in claim 1 wherein said outer pipe is concentrically spaced from said inner pipe by at least one standoff ring disposed therebetween.

3. The vent pipe as defined in claim 1 wherein said seal member is a graphoil annular gasket extending circumferentially around said first end of said inner pipe.

4. The vent pipe as defined in claim 3 wherein said second end of said outer pipe includes an annular locking groove open to the exterior of said outer pipe and a plurality of slots extending between said annular groove and an end of said outer pipe and said first end of said outer pipe including a plurality of inwardly disposed locking tabs for selective locking engagement through said slots and into said locking groove of said adjoining pipe segment; and wherein said locking tabs and said corresponding slots are circumferentially spaced at irregular intervals such that adjoining pipe sections will matingly join in only one orientation.

5. A pipe segment for longitudinal connection to an adjoining pipe segment to form a vent pipe, said pipe segment comprising:

an inner pipe having an inner passageway, said inner pipe having a first end and a second end having a diameter greater than a diameter of said first end;

an outer pipe having a diameter greater than and concentrically disposed with said inner pipe to form an outer passageway between said inner pipe and said outer pipe, said outer pipe having a first end and a second end;

means for maintaining spacing between said inner pipe and said outer pipe;

an annular seal element circumferentially seated on said first end of said inner pipe for sealing engaging said second end of an adjoining inner pipe; and said first end of said outer pipe having at least one inwardly disposed locking tab and said second end of said outer pipe having an annular continuous locking groove open to the exterior of said outer pipe.

6. The vent pipe as defined in claim 5 wherein said second end of said outer pipe includes a plurality of slots extending between said annular groove and an end of said outer pipe whereby said locking tabs are passed through said slots for insertion into said annular groove.

7. The vent pipe as defined in claim 6 wherein said locking tabs and said corresponding slots are circumferentially spaced at irregular intervals such that adjoining pipe sections will matingly join in only one orientation.

8. The vent pipe as defined in claim 5 wherein said outer pipe is concentrically spaced from said inner pipe by at least one standoff ring disposed therebetween.

9. A pipe segment for longitudinal connection to an adjoining pipe segment to form a vent pipe, said pipe segment comprising:

an inner pipe having an inner passageway, said inner pipe having a first end and a second end having a diameter greater than a diameter of said first end;

an outer pipe having a diameter greater than and concentrically disposed with said inner pipe to form an outer passageway between said inner pipe and said outer pipe, said outer pipe having a first end and a second end;

means for maintaining spacing between said inner pipe and said outer pipe;

an annular seal element circumferentially seated on said first end of said inner pipe for first end of said inner pipe for sealing engaging said second end of an adjoining inner pipe; and said first end of said outer pipe having at least one inwardly disposed locking tab and said second end of said outer pipe having an annular locking groove open to the exterior of said outer pipe.

10. The vent pipe as defined in claim 9 wherein said seal member includes a graphite material to facilitate mating connection of adjoining inner pipes.

11. The vent pipe as defined in claim 9 wherein said seal member is a graphoil gasket extending circumferentially around said first end of said inner pipe.

* * * * *